United States Patent [19]

Kato

[11] Patent Number: 4,637,775
[45] Date of Patent: Jan. 20, 1987

[54] INDUSTRIAL ROBOT DEVICE

[75] Inventor: Hisao Kato, Aichi, Japan

[73] Assignee: Mitsubishi Denki Kabushiki Kaisha, Japan

[21] Appl. No.: 680,726

[22] Filed: Dec. 12, 1984

[30] Foreign Application Priority Data

Dec. 15, 1983 [JP] Japan .................................. 235137

[51] Int. Cl.$^4$ ........................................... B25J 11/00
[52] U.S. Cl. .............................. 414/744 R; 51/125.5; 409/201; 414/735; 901/41
[58] Field of Search ................. 414/730, 735, 744 A, 414/744 R, 680; 901/15, 27–30, 36, 41–43, 48, 49; 409/8, 183, 201, 232; 51/125.5, 229

[56] References Cited

U.S. PATENT DOCUMENTS 4,179,783  12/1979  Inoyama et al. .................... 29/281.5

FOREIGN PATENT DOCUMENTS 136258  11/1978  Japan .................................. 414/730
57-39197  8/1982  Japan .

*Primary Examiner*—Joseph F. Valenza
*Assistant Examiner*—Donald W. Underwood
*Attorney, Agent, or Firm*—Sughrue, Mion, Zinn, Macpeak and Seas

[57] ABSTRACT

An industrial robot device is disclosed which is equipped at a forward end of an arm with a work tool such as a cutting or a grinding tool, and in which there is provided a device such as a friction damper for suppressing sudden movement of the work tool in the direction of the normal displacement thereof towards and away from a workpiece. Damage to the work tool and workpiece due, for instance, to sudden changes of load, is thereby prevented.

12 Claims, 6 Drawing Figures

INDUSTRIAL ROBOT DEVICE

BACKGROUND OF THE INVENTION

The present invention relates to an improved industrial robot device in which a work tool such as a cutting or a grinding tool is mounted at an end portion of an arm of the robot.

Conventionally, in cutting or grinding work, a work tool is mounted at a forward end of an arm of a robot and operations for achieving a desired purpose are performed while urging the work tool against a workpiece with a predetermined pressure or at a predetermined speed. Upon variations in load, however, the position and orientation of the work tool may suddenly change so that the work tool too closely approaches or separates from the workpiece. This phenomenon is especially prominent when the hardness of the workpiece is low.

If the work tool is mounted on a finger portion of a robot, which finger portion is connected with an arm portion by means of a helical spring (as disclosed, for example, in Japanese Utility Model Publication No. 39197/82), deformation or damage may be prevented in the work tool to some degree. However, since an arm portion and a finger portion are connected to each other through a helical spring in the robot, there is a disadvantage that abrupt changes in the position of the work tool cannot be prevented. That is, as the load changes, for example, if the work tool moves suddenly in a direction away from the workpiece, the helical spring will bend, making the work tool suddenly approach the workpiece due to a reaction force in a subsequent state and collide against the workpiece, thereby damaging both the work tool and the workpiece.

SUMMARY OF THE INVENTION

The present invention has been achieved to eliminate the above-mentioned disadvantages.

The invention provides an industrial robot device which is provided with a damper such as a frictional damper for suppressing sudden displacement of a work tool occurring upon sudden variations in a load.

The following advantages are obtained due to preventing sudden displacement of the work tool upon sudden variations in load:

(a) deformation of and damage to the work tool are prevented, which also improves the safety of the installation; and (b) the accuracy of the machining operation is improved.

In a preferred embodiment of the invention, an industrial robot device is provided with: (a) a support frame for supporting a work tool; (b) means provided on the support frame for supporting the work tool displaceably relative to the support frame, the supporting means including an elastic member for generating an elastic force in a predetermined direction and applying this force to the work tool; and (c) a damper provided on the support frame for exerting a damping force onto a displaecable member included in the supporting means, the displaceable member being prevented from being displaced by an external force as well as the force of the elastic member acting on the work tool.

DESCRIPTION OF THE PREFERRED EMBODIMENTS

Figure 1:
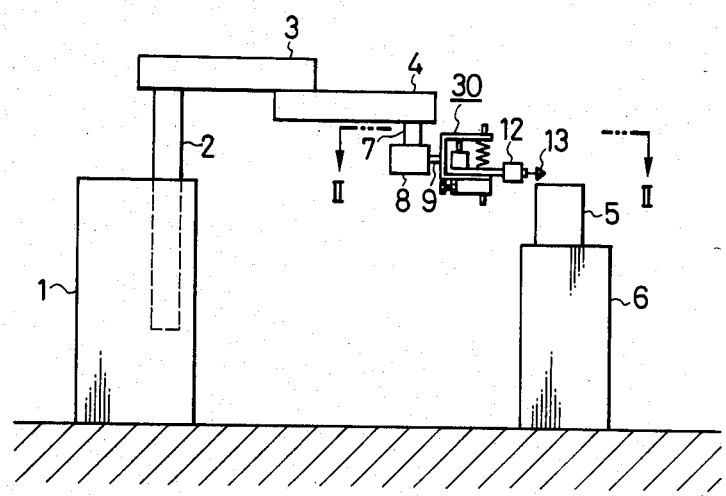
FIG. 1 is a side elevational view illustrating a preferred embodiment of an industrial robot device constructed according to the present invention.

Referring to the drawings, a preferred embodiment according to the present invention will be described.

In FIG. 1, reference numeral 1 designates a robot body; 2, a vertically movable shaft extending from the robot body 1; 3, a first arm secured to the upper end of the shaft 2 and rotatable horizontally 4, a second arm secured to the forward end of the first arm 3 and rotatable horizontally; 5, a workpiece; 6, a work table; 7, a rotary shaft rotatably secured to the forward end of the second arm 4; and 8, a rotary shaft driving device attached to the rotary shaft 7 and arranged to drive a rotary shaft 9 extending perpendicularly to the rotary shaft 7.

Although not shown in the drawings, a driving mechanism including a motor is incorporated in each of the connecting portion between the shaft 2 and the first arm 3, the connecting portion between the first arm 3 and the second arm 4, and the connecting portion between the second arm 4 and the rotary shaft 7.

Figure 2:
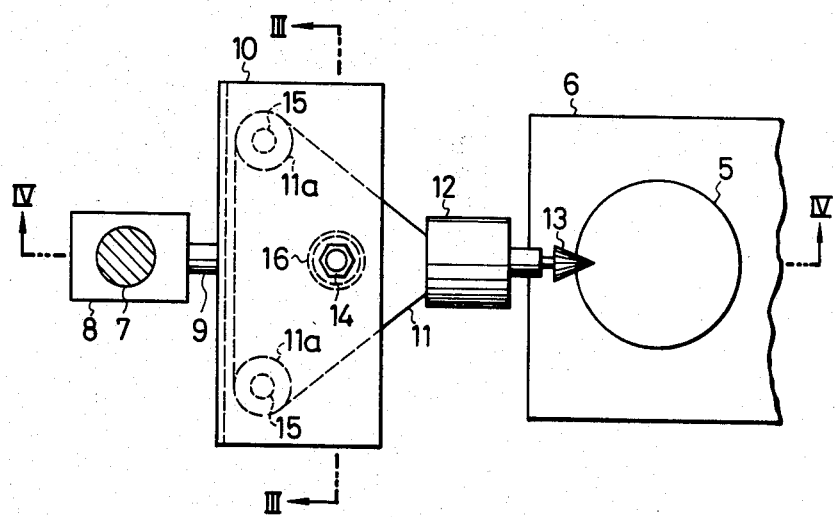
FIG. 2 is a plan view in the direction of a line II—II in FIG. 1.
Figure 3:
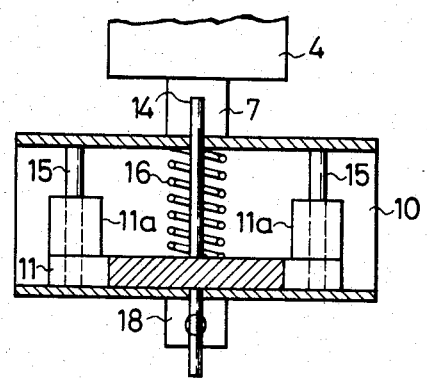
FIG. 3 is a cross-sectional view taken along a line III—III in FIG. 2.
Figure 4:
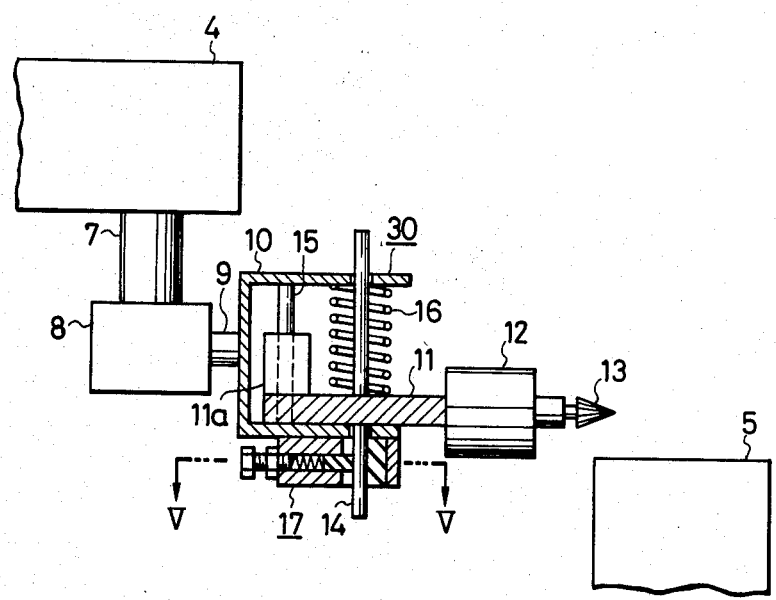
FIG. 4 is a cross-sectional view taken along a line IV—IV in FIG. 2.

In FIGS. 2 to 4, reference numeral 10 designates a support frame having a U-shaped cross section and intergrally fixed to the forward end of the rotary shaft 9; 11, a tool mounting table arranged in the support frame 10; 12, a tool fixed to the tool mounting table 11; 13, a cutting edge of the tool 12; 14, a slidable rod extending perpendicularly to the tool mounting table 11 and slidably passing through holes formed in the upper and lower faces of the support frame 10; and 15, guide rods fixed to the support frame 10 for slidably guiding the tool mounting table 11, two guide rods being provided in this embodiment. The sliding portion of the tool mounting table 11 is integrally reinforced with sleeves 11a. Reference numeral 16 designates a spring mounted around the sliding rod 14 for urging the tool mounting table 11 downwardly, the spring 16 thus generating a force for urging the cutting edge 13 against the workpiece 5. The force of the spring 16 should be chosen in accordance with the type of each of the cutting edge 13 and the workpiece 5.

Figure 5:
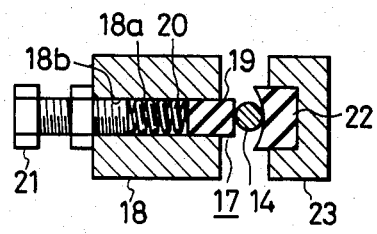
FIG. 5 is an enlarged cross-sectional view taken along a line V—V in FIG. 4.

Reference numeral 17 designates a friction damper arranged as shown in FIG. 5. Reference numeral 18 designates a holder fixed to the lower face of the support frame 10 and having a through hole 18a horizontally formed in its center portion, one end (the left-hand end in the drawing) of the through hole 18a being formed as a threaded hole 18b; 19, a movable friction member, a portion of which is slidably fitted in the through hole 18a and one end of which abuts the sliding rod 14; 20, a spring mounted in the through hole 18a for providing a force for urging the movable friction member 19 against the sliding rod 14; 21, an adjusting bolt screwed into the threaded hole 18b for adjusting the force of the spring 20; 22, a fixed friction member abutting the sliding rod 14; and 23, a holder integrally holding the fixed friction member 22 and fixed to the lower face of the support frame 10 opposite the holder 18.

Since the movable friction member 19 is urged against the sliding rod 14 by the spring 20, a friction force is produced between the sliding rod 14 and each of the movable and fixed friction members 19 and 22. The strength of this friction force is adjustable by the adjusting bolt 21. The movable and fixed friction pieces 19 and 22 may be made of a synthetic resin material.

A working device 30 is constituted by the above-mentioned parts 10 to 17. The entirety of the working device 30 can be tilted by rotating the shaft 9 so as to cause the direction of the spring 16 to align with the direction of contact between the workpiece 5 and the cutting edge 13 so that the friction damper 17 operates effectively. Moreover, it is possible to operate on a workpiece in any direction by operations of the rotary shafts 7 and 9.

Figure 6:
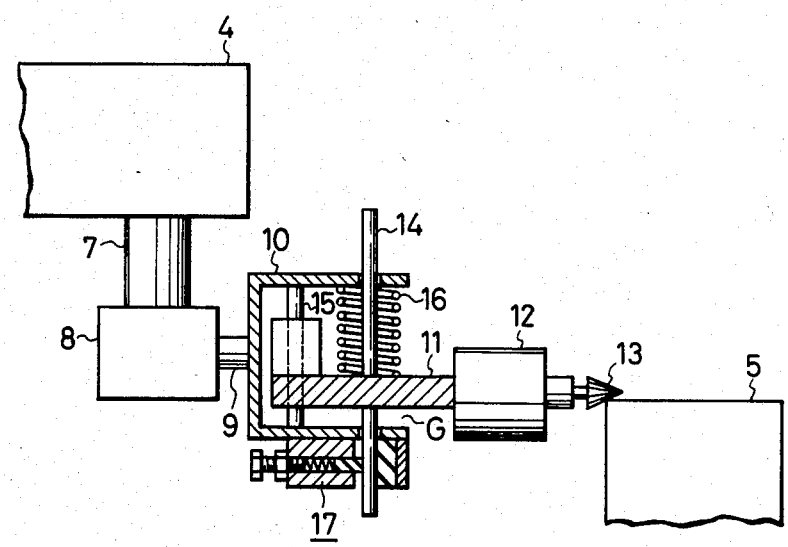
FIG. 6 is a cross-sectional view illustrating operations on a workpiece, corresponding to the state of FIG. 2.

In the arrangement described above, if cutting or grinding work is performed while the cutting edge 13 of the tool 12 is urged against the workpiece 5 in such a manner that the spring 16 slightly bends and a gap G is formed between the lower face of the support frame 10 and the tool mounting table 11 (see FIG. 6), sudden changes in the position of the tool are prevented by operation of the friction damper 17, even if sudden changes occur in the load. When a sudden change occurs in the load and a force acts on the work tool 12 which would displace it in the direction away from the workpiece 5 or in the direction which would more strongly press it against the workpiece 5, the displacement force is accompanied by a force tending to move the sliding rod 14. However, because the lower end portion of the sliding rod 14 is elastically sandwiched between the movable and fixed friction members 19 and 22, the sliding rod 14 is frictionally fixed. Due to this frictional fixing, sudden displacement of the sliding rod 14 is prevented. Therefore, sudden displacement is prevented from occurring also in the work tool 12, thereby preventing damage to the work tool 12 as well as the workpiece 5.

I claim:

1. An industrial robot device in which a work tool such as a cutting or a grinding tool is mounted at a forward end of an arm, said device comprising:
   (a) a support frame for supporting said work tool;
   (b) means provided on said support frame for supporting said work tool displaceably relative to said support frame, said supporting means comprising an elastic member for applying an elastic force in a predetermined direction to said work tool and a displaceable member movable with said work tool; and
   (c) a friction damper comprising a pair of friction members sandwiching said displaceable member therebetween, said friction damper being provided on said support frame for exerting a damping force on said displaceable member, said damping force preventing sudden displacement of said work tool by an external force and by said elastic force.

2. The industrial robot device according to claim 1, further comprising means for supporting said support frame for rotation in horizontal and vertical planes, said elastic member engaging said support frame so that the direction of the force provided by said elastic member is set in accordance with the rotation of said support frame in said both directions.

3. The industrial robot device according to claim 1, wherein said supporting means further comprises a mounting table to which said work tool is fixedly connected, a guide member provided on said support frame for guiding and supporting said mounting table displaceably in a predetermined direction, said displaceable member being fixed to said mounting table, said elastic member being positioned between said support frame and said mounting table and applying elastic force to said mounting table.

4. The industrial robot device according to claim 3, wherein said elastic member is disposed to provide a force acting on said mounting table in a direction perpendicular thereto.

5. The industrial robot according to claim 4, wherein said direction perpendicular thereto is the same as a displacement direction of said mounting table determined by said guide member.

6. The industrial robot device according to claim 4, wherein said displaceable member comprises a rod extending in the same direction as a displacement direction of said guide member.

7. The industrial robot device according to claim 6, wherein said elastic member is disposed along said rod.

8. The industrial robot device according to claim 6, wherein said damper is provided on said support frame and in frictional contact with an end portion of said rod.

9. The industrial robot device according to claim 6, wherein said support frame comprises upper and lower face portions, each of which is provided with a through hole through which said rod passes.

10. The industrial robot device according to claim 1, wherein one of said pair of friction members is arranged to be movable towards and away from said displaceable member.

11. The industrial robot device according to claim 10, further comprising a holder, said movable friction member being fixed in said support frame and disposed in a hollow portion of said holder, and a second elastic member for applying a force to said movable friction member for urging said movable friction member toward the other friction member.

12. The industrial robot device according to claim 11, further comprising urging force adjusting means provided in said hollow portion for adjusting a force of said elastic member provided in said hollow portion.

* * * * *